United States Patent
Kohn et al.

(10) Patent No.: US 8,312,116 B2
(45) Date of Patent: *Nov. 13, 2012

(54) PLATFORM DISCOVERY, ASSET INVENTORY, CONFIGURATION, AND PROVISIONING IN A PRE-BOOT ENVIRONMENT USING WEB SERVICES

(75) Inventors: Rodolfo Kohn, Cordoba (AR); Arzhan Kinzhalin, Cordoba (AR); David Lombard, Los Alamitos, CA (US); Ricardo Morin, Portland, OR (US)

(73) Assignee: Intel Corporation, Santa Clara, CA (US)

(*) Notice: Subject to any disclaimer, the term of this patent is extended or adjusted under 35 U.S.C. 154(b) by 7 days.

This patent is subject to a terminal disclaimer.

(21) Appl. No.: 13/271,975

(22) Filed: Oct. 12, 2011

(65) Prior Publication Data

US 2012/0030324 A1 Feb. 2, 2012

Related U.S. Application Data

(63) Continuation of application No. 12/286,191, filed on Sep. 29, 2008, now Pat. No. 8,041,794.

(51) Int. Cl.
*G06F 15/177* (2006.01)
(52) U.S. Cl. ............. 709/222; 713/2; 717/172; 717/178
(58) Field of Classification Search .................. None
See application file for complete search history.

(56) References Cited

U.S. PATENT DOCUMENTS

| | | | |
|---|---|---|---|
| 6,950,863 B1 * | 9/2005 | Pham et al. | 709/221 |
| 7,103,529 B2 | 9/2006 | Zimmer | 703/27 |
| 7,383,534 B1 * | 6/2008 | Agbabian et al. | 717/120 |
| 7,472,422 B1 * | 12/2008 | Agbabian | 726/25 |
| 7,565,431 B2 * | 7/2009 | Willging et al. | 709/226 |
| 7,685,281 B1 * | 3/2010 | Saraiya et al. | 709/226 |
| 2006/0184349 A1 * | 8/2006 | Goud et al. | 703/24 |
| 2007/0150705 A1 | 6/2007 | Mishaeli et al. | 712/218 |
| 2007/0240162 A1 * | 10/2007 | Coleman et al. | 718/104 |
| 2007/0288612 A1 * | 12/2007 | Hall | 709/223 |
| 2008/0098321 A1 * | 4/2008 | Krithivas | 715/771 |
| 2008/0120499 A1 | 5/2008 | Zimmer et al. | 713/2 |

(Continued)

FOREIGN PATENT DOCUMENTS

WO 2005006186 1/2005

OTHER PUBLICATIONS

SMI Tutorial: SLP, p. 1 (http://www.wbemsolutions.com/tutorials/snia/SMI/Techical/slp.html), 2006.*

(Continued)

*Primary Examiner* — Ario Etienne
*Assistant Examiner* — Clayton R Williams
(74) *Attorney, Agent, or Firm* — Trop, Pruner & Hu, P.C.

(57) ABSTRACT

In one embodiment, the present invention includes a method for initializing a common information model (CIM) broker and a SLP service agent of a system in a pre-boot environment, transmitting a multicast request and receiving a unicast advertisement from a directory agent, registering a web-based enterprise management (WBEM) service to the directory agent, and configuring, provisioning, and/or performing asset inventory of the system in the pre-boot environment responsive to information from a resource manager. Other embodiments are described and claimed.

18 Claims, 4 Drawing Sheets

U.S. PATENT DOCUMENTS

| | | | |
|---|---|---|---|
| 2008/0155100 A1* | 6/2008 | Ahmed et al. | 709/226 |
| 2009/0019278 A1* | 1/2009 | Shah et al. | 713/100 |
| 2009/0070579 A1* | 3/2009 | Murakami et al. | 713/155 |
| 2009/0204961 A1* | 8/2009 | DeHaan et al. | 718/1 |

OTHER PUBLICATIONS

SMI Tutorial: SLP, p. 1 (http://www.wbemsolutions.com?tutorials/snia/SMI/Technical/slp.html), 2006.

European Patent Office, Combined Search and Opinion for EPO Application No. 09 252 307.5, dated Feb. 3, 2010, 7 pgs.

Cruz, T. et al.: "Enabling preOS desktop management" IFIP/IEEE Eight International Symposium on Integrated Network Management Mar. 28, 2003, pp. 321-334, XP002563694.

Young-Ho Kim et al: "Design of platform management provider based on HPI manageability block using CIM/WBEM standards" Advanced Communication Technology, 2005, ICACT 2005. The 7th International Conference on Phoenix Park, Korea Feb. 21-23, 2005, Piscataway, NJ, USA,IEEE, vol. 2, Feb. 21, 2005, pp. 927-932, XP010813823.

Kinzhalin A. et al.: "Enabling the Autonomic Data Center with a Smart Bare-Metal Server Platform" ICAC' 09, Jun. 15, 2009-Jun. 19, 2009, pp. 87-95, XP002563695.

Korean Patent Office, Notice of Preliminary Rejection mailed Mar. 11, 2011 in Korean application No. 2009-0092529.

U.S. Appl. No. 11/897,355, filed Aug. 30, 2007, entitled "Method for Firmware Isolation," by Jiewen Yao, et al.

U.S. Appl. No. 12/156,223, filed May 30, 2008, entitled "Enabling Byte-Code Based Image Isolation," by Jiewen Yao, et al.

* cited by examiner

PLATFORM DISCOVERY, ASSET INVENTORY, CONFIGURATION, AND PROVISIONING IN A PRE-BOOT ENVIRONMENT USING WEB SERVICES

This application is a continuation of U.S. patent application Ser. No. 12/286,191, filed Sep. 29, 2008, now U.S. Pat. No. 8,041,794 the content of which is hereby incorporated by reference.

BACKGROUND

As the need for increased data processing expands, many companies have developed data centers to act as data warehouses. Such data centers can include a large number of individual computer systems. Oftentimes, such systems are configured as server computers such as blade servers that are adapted in racks. While many of the systems may be used for data storage and retrieval, various systems can be differently configured to handle different tasks. To provide for different system configurations, typically personnel of the data center will manually configure individual systems with different hardware settings and/or software to enable their use for different tasks. This system configuration will typically be centralized at a resource manager (or provisioning agent) and will require a high level of human intervention.

For example, in some data center environments, it can be useful to provide different configurations to different servers to enable the handling of different workloads with optimum performance and lowest costs. However to do this, it is required to provide a server identifier and configuration information to a provisioning agent, to differentiate the server and to properly handle the configuration. However, this raises complexity and requires a high level of manual intervention to determine the abilities of each server, in order to determine the correct provisioning and establish a mapping, at the provisioning agent, between this correct provisioning and the particular server.

Some amount of provisioning of a system in a data center can be done in a so-called pre-boot environment in which an operating system has yet to be loaded on the machine. One such pre-boot environment in current use is called a pre-boot execution environment (PXE) in which a network-connected system can be provided with software such as operating system (OS). However, PXE suffers known drawbacks such as the use of user datagram protocol (UDP) for communication, which is a non-reliable protocol. In addition, it requires a minimum configuration for relating server information, such as a media access control (MAC) address with the OS image. Finally, provisioning a system using PXE has limited possibilities to carry out policy and capability-based resource allocation.

DETAILED DESCRIPTION

Figure 1:
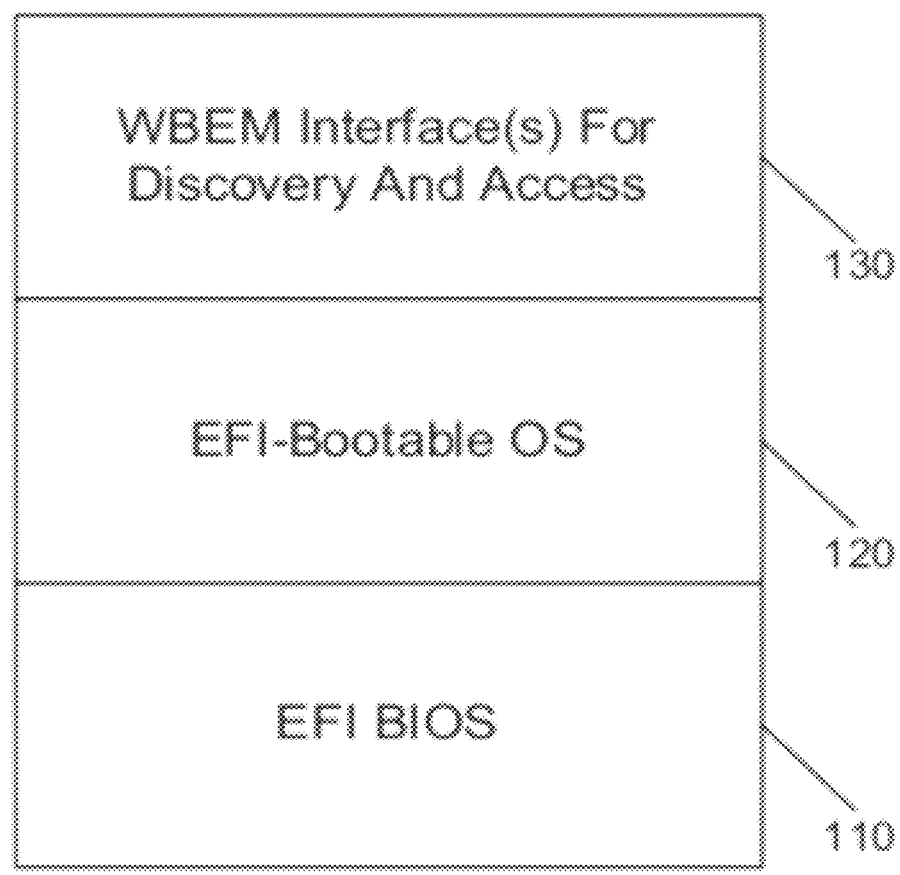
FIG. 1 is a block diagram of a non-volatile storage in accordance with one embodiment of the present invention.

Embodiments may be used to provide for completely automated standard-based server node discovery, asset inventory, configuration, and provisioning in a pre-boot environment. More specifically, a bare-metal server can be discovered, configured, provisioned, and booted at time zero, with zero previous configuration of the server, with zero previous operating system or software installation, and with use of reliable standard protocols. This also implies that, although possible, no human intervention is required to provide any server identification-based configuration to any system involved in the mentioned activities (discovery, asset inventory, configuration, provisioning, and booting), such as a resource manager. This is also possible when the system is in pre-boot state. As used herein, time zero is the period of time when the server is taken out of the box from the factory until the server is booted the first time, typically to perform initial configurations, e.g., establish out-of-band network settings, set non-default basic input/output system (BIOS) configurations, install latest firmware, and finally install an operating system. As used herein, the term bare-metal connotes the system state at time zero; a system could be returned to bare metal, and time zero "reinstated" by fully resetting the system configuration to factory conditions (including Baseboard Management Controller et al.) and clearing/ignoring all disk content. As used herein, pre-boot state is the system state during pre-boot time. As used herein, pre-boot time is the period of time from when the server's main processors are powered on until the server begins to load the final operating system that, upon having been loaded, marks the end of the booting process and allows the system to run user applications. A system re-enters the pre-boot time after it is reset or powered off and subsequently powered on again. As used herein, pre-boot environment is the system environment during pre-boot time.

By performing pre-boot server discovery with zero configuration, it is not necessary to keep track of a MAC address or any other distinctive server identifier in order to determine the image to be provisioned. This opens the way for resource managers to make policy-based decisions for resource allocation of servers in the pre-boot state, as well as for their configuration and provisioning. For example, there could be a policy rule telling the resource manager to allocate a workload with certain characteristics to the first server that complies with a list of requirements, such as more than one processor or multi-core processors. This rule could also tell the resource manager to configure each processor's model specific registers (MSRs) in a specific manner.

Pre-boot server discovery can be performed using highly reliable Web-Based Enterprise Management (WBEM)-compliant protocols, minimizing error probabilities. WBEM is supported by the Distributed Management Task Force (DMTF), an organization involving the most distinguished companies. By using reliable protocols, embodiments can avoid the use of non-reliable protocols, such as UDP, in which datagrams are sent without guaranteed reliability or ordering, as used by the Preboot Execution Environment (PXE). For example, in a data center with numerous (e.g., thousands) of servers a failure could occur while downloading an image. When such provisioning is done using PXE, the failure may go undetected due to the unreliable communication scheme.

Automated pre-boot platform configuration and provisioning can be carried out based on platform capabilities, workload requirements, and high-level policies. Platform capabilities inquiry, configuration, and provisioning may use reliable web services protocols, such as web services-common information model (WS-CIM) and WS-Management which are widely accepted within the industry. Pre-boot configuration and provisioning can use CIM, which is an industry-wide standard. The protocols used can transparently integrate security capabilities and allow firewall traversal. Finally, the preboot methods described herein require zero human intervention, besides high-level policies definition that can be interpreted by a resource manager.

In one embodiment a system can include, stored in a non-volatile storage for execution by a pre-boot basic input/output system (BIOS), a payload including an operating system (OS) kernel, a DHCP client, a CIM broker, appropriate CIM schemas for asset inventory, platform configuration and provisioning, and appropriate CIM providers for asset inventory, platform configuration and provisioning. Still further, the communication with the system for asset inventory, platform configuration, and provisioning can be realized with WS-Management protocol, Web Services Distributed Management (WSDM) or WS-CIM. The system may be a server that is within a data center, e.g., as a rack-mounted blade server.

To enable discovery, the system may be coupled to a service location protocol (SLP) service agent. In one embodiment, the operating system kernel may be Extensible Firmware Interface (EFI)-bootable, and it, along with the applications, the CIM providers, and the CIM model, may be stored in a flash or other non-volatile storage of the system.

Referring now to FIG. 1, shown is a block diagram of a non-volatile storage 100 in accordance with one embodiment of the present invention. As shown in FIG. 1, the non-volatile storage may be a flash memory that includes a pre-boot BIOS, namely an EFI BIOS 110. Furthermore, an OS kernel 120, which may be an EFI-bootable kernel and which may correspond to a small footprint OS such as a Linux™ kernel, is also present within storage 100. Still further, storage 100 may further include WBEM interfaces 130, which may be used for discovery and access between a system including the storage and other systems within a network before the system has booted. While shown with this particular implementation of a BIOS stack in which the BIOS, OS kernel and WBEM interfaces are commonly stored in a single flash memory, embodiments are not limited in this regard and in other embodiments different manners of providing a BIOS stack such as having the payload stored in a different non-volatile storage device, may be realized.

In this implementation of FIG. 1, on power-up of a system including storage 100, EFI BIOS 110 may be executed, which may trigger the execution of OS 120 that in turn can cause the WBEM interfaces 130 to be enabled to allow for initial communications according to a reliable protocol. In this way, configuration and provisioning of the system may occur in the pre-boot environment, without providing any initial configuration information, such as a MAC address or other system identifier to any system involved such as the resource manager. Of course, an internet protocol (IP) address, e.g., provided by a dynamic host configuration protocol (DHCP) server, as discussed below, is associated with the system for the communication to occur.

In one embodiment, the system runs as follows. After initial physical installation and with no further human configuration, as soon as the server is turned on and before the operating system booting process begins, the server can be discovered by a resource manager, which can query capabilities, configure and provision it using WBEM standard protocols. The discovery can be done using the Service Location Protocol (SLP), which is a WBEM compliant protocol defined by the Internet Engineering Task Force (IETF), request for comment (RFC) 2608.

In addition to a server system including the above-described components in non-volatile storage, the discovery method may be implemented using a SLP directory agent of a data center. Provided that the directory agent implements RFC 3082 or a similar publish/subscribe mechanism, a resource manager coupled to the directory agent (e.g., with the data center) is notified whenever a new WBEM service is registered.

Once a resource manager discovers the server in this way, the resource manager can automatically configure the newly discovered platform through CIM and WS-CIM, or WS-Management, as examples. In one embodiment, processor features and other platform features thus can be configured by the resource manager before the booting process continues. After or before configuration, the server can be automatically provisioned with all or part of a certain operating system, along with one or more workloads, all using CIM and WS-CIM or WS-Management protocols. Finally, the server is instructed, through CIM, to continue booting with the preferred image. Note that all of these operations are done in a pre-boot environment and while using a reliable communication protocol.

Figure 2:
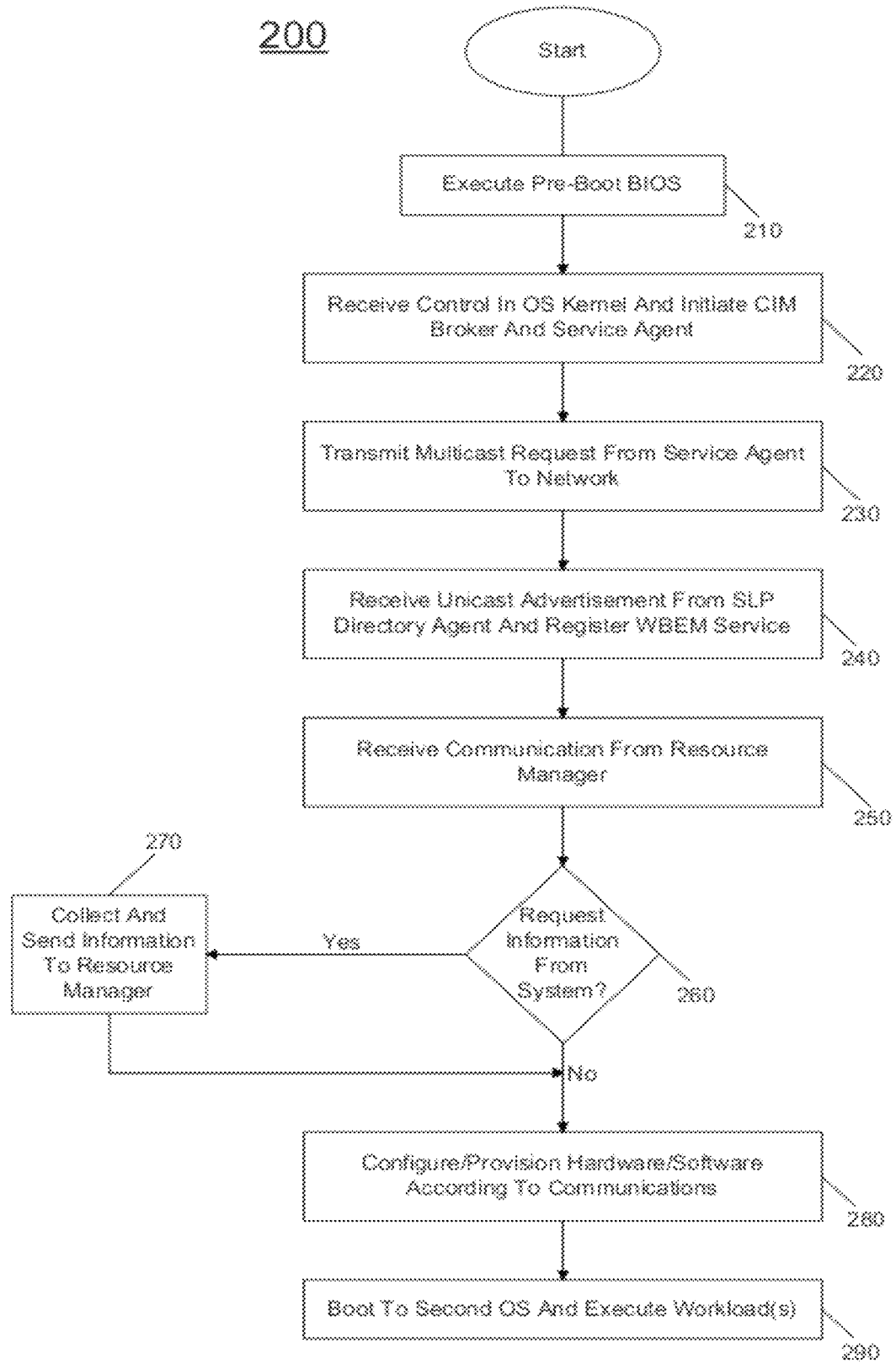
FIG. 2 is a flow diagram of a method in accordance with one embodiment of the present invention.

As shown in FIG. 2, a method 200 may be used to discover, configure and provision a platform without any predetermined configuration information present in the platform while in a pre-boot environment nor in any system involved, such as a resource manager. Specifically, as shown in FIG. 2 method 200 may begin by executing a pre-boot BIOS on the platform (block 210). In one embodiment, the pre-boot BIOS may be an EFI BIOS that is part of a BIOS stack such as described with regard to FIG. 1.

When the BIOS has executed such that the system has been self-tested and is determined to be valid, the BIOS may pass control to an OS kernel that is stored, in one embodiment, in the same non-volatile memory (i.e., flash memory) as the BIOS. Specifically, as shown in FIG. 2 at block 220, this OS kernel, which may be a minimal OS kernel, also referred to herein as a pre-boot OS, such as a Linux™ kernel to perform various operations for communications in a CIM or WBEM environment, may be executed. As part of this OS kernel, a dynamic host configuration protocol (DHCP) routine may be executed to receive an internet protocol (IP) address from a DHCP server, which may be in the network with the platform. For example, in one implementation a data center may include multiple servers (each of which can be provisioned as described herein) and a DHCP server, along with other control systems such as a SLP directory agent and a resource manager, among others. Alternately this routine may be performed in the pre-boot BIOS, in some embodiments. Further, this OS kernel may initiate a CIM broker and a service agent, both of which may also be stored in the same non-volatile storage.

Referring still to FIG. 2, this service agent may transmit a multicast request to the network (block 230). Specifically, this multicast request may correspond to a request for finding a directory agent or service, such as an SLP directory agent. Responsive to this request, a directory agent, such as an SLP directory agent, may transmit a unicast acknowledgement, over a reliable protocol, that is thus received by the platform, and more particularly by the service agent (block 240). Then, the service agent may register its WBEM service to the directory agent. While the scope of the present invention is not limited in this regard, in various embodiments the service agent may send a registration message to the directory agent to indicate that it is capable of performing one or more WBEM services. In one embodiment, the registration message includes the type of service (e.g., a given WBEM service), the IP address or URL of the service and the port number to which the service is listening, among other information.

Next (although not shown in method 200), the directory agent may send a communication to a previously registered resource manager to indicate the presence of this newly registered WBEM service. Accordingly, the resource manager may perform discovery, configuration and provisioning on the platform in this pre-boot environment, and without any prior receipt of configuration information regarding the specific server, such as configuration entered by an information technology (IT) administrator associated to a server identifier. Instead, based on, e.g., predefined rules within the resource manager, such as set by IT personnel, the resource manager may send various messages to the platform, which may be received in this pre-boot environment, e.g., by the WBEM service (block 250). The communications may be decoded to determine whether information is requested from the system (diamond 260). For example, the resource manager may request receipt of capabilities and configuration information of the system, for example, its hardware configuration, as well as an identification of any software resident in the system, and which may be determined by accessing the system's hard drive or other configuration information, such as processor capabilities and so forth.

If such a request for information is received, the requested information may be collected and sent to the resource manager (block 270). If instead, the communication is not a request for system information, control can pass directly from diamond 260 to block 280. At block 280, various system components of the platform may be configured/provisioned. More specifically, various hardware and/or software components can be configured and/or provisioned by the resource manager. For example, the resource manager may send messages with WBEM-compliant protocols to configure the system through CIM. It could configure processor's model specific registers, indicate the virtual local area network (VLAN) to use to download a new image, provision an image to be stored in a disk and booted, provision a new payload with additional CIM functionalities, etc.

At the conclusion of such configuration/provisioning, the BIOS may conclude its operation and the system can be ordered by the resource manager to boot to a second, i.e., full OS, which may be present on a hard drive of the system (and which may have been provisioned by the resource manager) (block 290). Further at block 290, the system may execute any workloads that may have been provisioned by the resource manager. While shown with this particular implementation in the embodiment of FIG. 2, the scope of the present invention is not limited in this regard.

Figure 3:
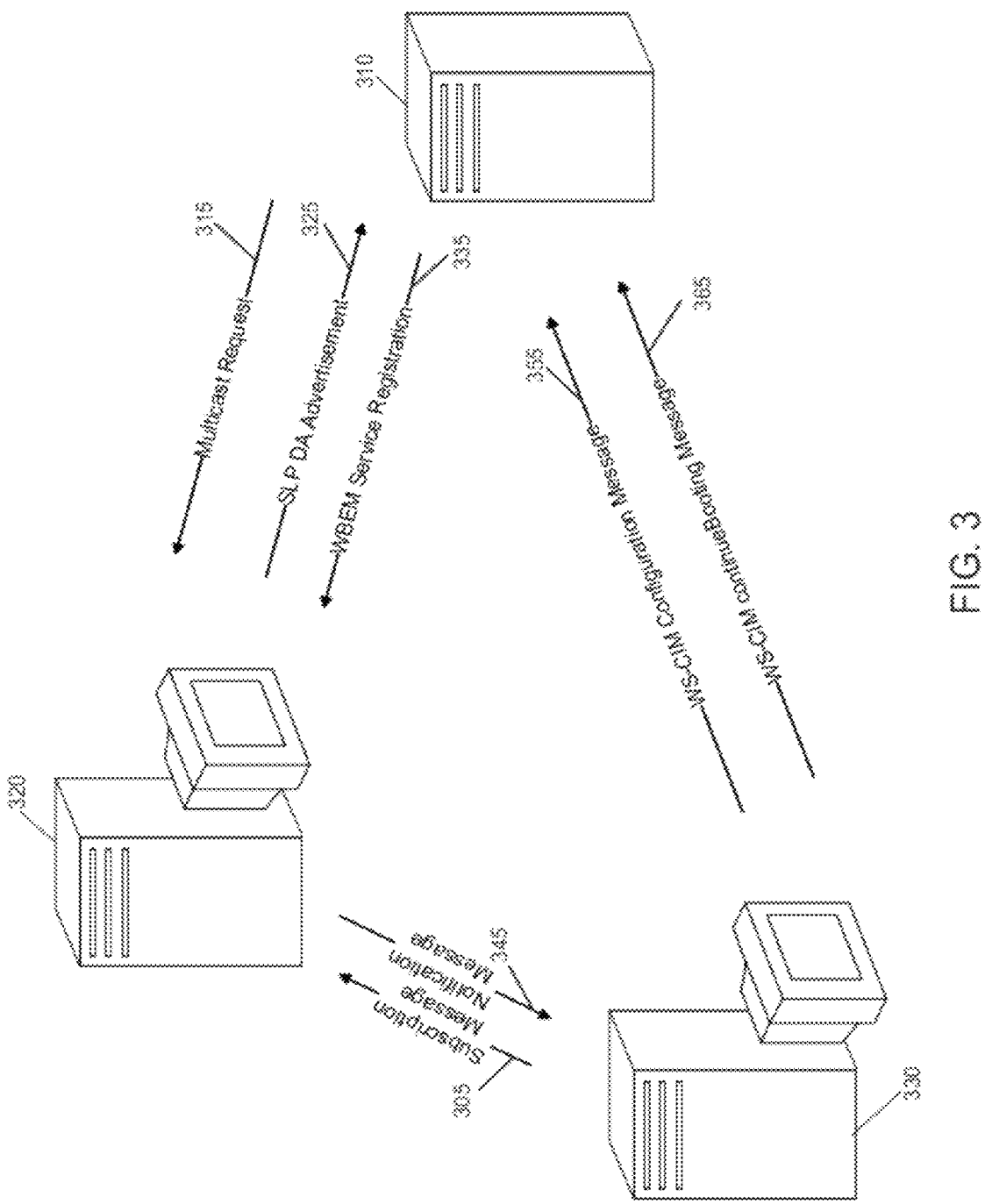
FIG. 3 is a block diagram of a data center in accordance with an embodiment of the present invention.

Referring now to FIG. 3, shown is a block diagram of a data center in accordance with an embodiment of the present invention. As shown in FIG. 3, data center 300 includes a platform 310, which may act as a client platform, e.g., a server that can be provisioned/configured via a resource manager 330. In addition, a directory agent 320, i.e., an SLP directory agent may also be present in the data center. Alternatively, directory agent 320 and resource manager 330 could run in the same server. While shown with only these three systems for ease of illustration, understand that a data center may include thousands of individual systems, and the presence of only a single client is for ease of illustration. Prior to enabling provisioning/configuring in accordance with an embodiment of the present invention, resource manager 330 may register to directory agent 320 to receive notifications for every newly registered WBEM service. Accordingly, resource manager may send a subscription message 305 to directory agent 320. In this way, directory agent 320 may provide notifications of new WBEM services to resource manager 330.

Still referring to FIG. 3, when system 310 is powered on, a BIOS, namely an EFI BIOS within the system may be executed and pass control to a payload, e.g., stored in the same flash storage as the BIOS which runs in pre-boot state. In one embodiment this payload may include a minimal OS kernel and WBEM interfaces. Accordingly, when such components are initialized, system 310 may send a multicast SLP directory agent (DA) request 315 to systems in the data center, including directory agent 320. Responsive to this message, directory agent 320 may send a SLP DA advertisement 325, using a reliable protocol based on transmission control protocol (TCP) upon receipt of which system 310 transmits a WBEM service registration message 335. Thus, using a reliable protocol based on TCP a service agent of the pre-boot environment of system 310 registers its WBEM service(s) to directory agent 320. In turn, directory agent 320 transmits a notification message 345, using a reliable protocol based on TCP indicating the presence of new WBEM services as indicated by the registration message. More specifically, this notification message is transmitted to resource manager 330. Note that this message is sent, since resource manager 320 previously registered for WBEM services with directory agent 320.

Accordingly, resource manager 330 may perform various actions to provision/configure system 310 using a reliable protocol, e.g., via a WS-CIM or WS-management protocol. Such actions may include, in one embodiment: querying of the system's capabilities; configuring various hardware of the system such as configuration registers, e.g., model specific registers (MSRs) of one or more processors within the system; and provisioning the system with a given OS image and one or more workloads to be performed, among other such actions. Thus as shown in FIG. 3 resource manager 330 sends WS-CIM configuration messages 355 to be used to configure and provision the system, and a WS-CIM continue booting message 365, to indicate to system 310 that it should continue its normal booting activities. Upon fully completing BIOS execution and upon receipt of a message from resource manager 330 indicating to continue booting, system 310 passes control to an OS, such as a provisioned OS. In one embodiment, the continue booting message may invoke a CIM method to order system 310 to continue booting with the image in disk, possibly provided by the resource manager. When booting finishes, a user can run one or more desired applications.

In various embodiments, the use of SLP sharply decreases error probabilities in the discovery phase because the directory agent sends out service advertisements in random periods. Eventually, the client system receives one of the directory agent advertisements and identifies it. Note that after such advertisements, the remaining communications may use TCP-based protocols, which provide for reliable communications.

Embodiments thus need no configuration for discovery or human intervention. Instead, a server need only to be physically racked and turned on. Communications occur using reliable protocols, and embodiments run in a pre-boot environment based on CIM and WBEM to provide easy integration with the ecosystem, enabling server configuration and provisioning to be realized based on server capabilities, workload characteristics and high level policies. Further, server discovery and allocation/configuration decisions can be done very fast, as some embodiments may run as a payload based on an EFI BIOS. By using web services management protocols, such as WS-CIM (or WS-Management), easier firewall traverse capabilities can enable new services for servers and High Performance Computing (HPC), and allow the addition of security features and the use of secure protocols such as WS-Security and secure sockets layer (SSL).

Figure 4:
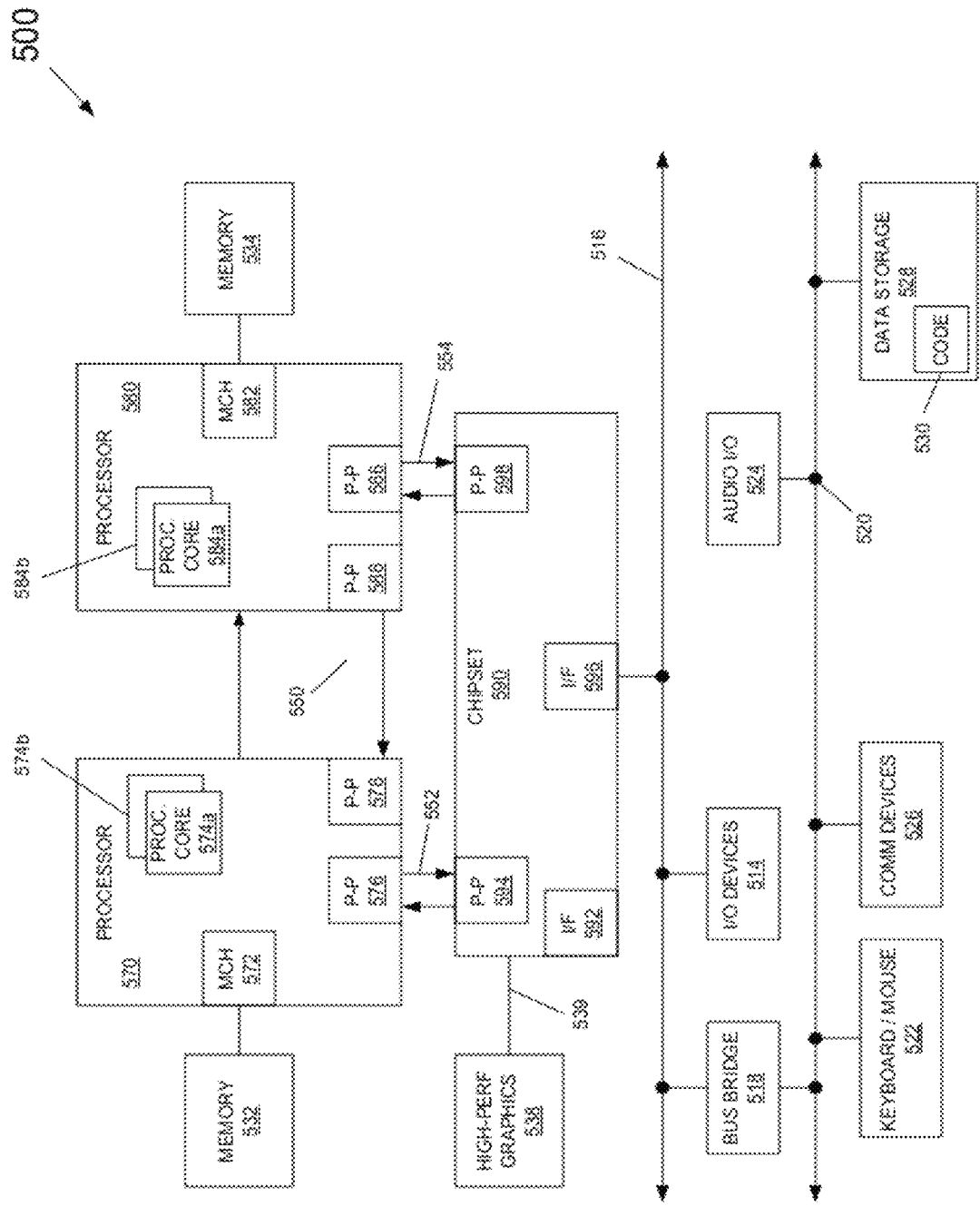
FIG. 4 is a block diagram of a client system in accordance with an embodiment of the present invention.

Embodiments may be implemented in many different system types. Referring now to FIG. 4, shown is a block diagram of a client system such as a server, e.g., a blade server for incorporation into a data center in accordance with an embodiment of the present invention. As shown in FIG. 4, multiprocessor system 500 is a point-to-point interconnect system, and includes a first processor 570 and a second processor 580 coupled via a point-to-point interconnect 550. As shown in FIG. 4, each of processors 570 and 580 may be multicore processors, including first and second processor cores (i.e., processor cores 574a and 574b and processor cores 584a and 584b), although potentially many more cores may be present in the processors.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 4, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 4, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a flash memory or other non-volatile storage device which may include code 530, in one embodiment. Such code may be incorporated as a BIOS stack such as that of FIG. 1 to enable automated discovery, asset inventory, configuration and provisioning while the system is in a pre-boot and may be in an unconfigured or configured state. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving in a service location protocol (SLP) directory agent a multicast request from a system without predetermined configuration information and having a common information model (CIM) broker and a service agent, the system coupled to the SLP directory agent via the service agent;
   providing a unicast acknowledgement from the SLP directory agent to the system;
   receiving a registration of a web-based enterprise management (WBEM) service in the SLP directory agent via the service agent; and
   sending a message to a resource manager coupled to the SLP directory agent to indicate presence of the WBEM service.

2. The method of claim 1, further comprising sending a message from the resource manager to the WBEM service, and receiving configuration information in the resource manager from the WBEM service responsive to the message.

3. The method of claim 2, further comprising transmitting at least one configuration message from the resource manager to configure the system in a pre-boot environment responsive to the at least one configuration message.

4. The method of claim 3, wherein configuring the system includes updating at least one configuration register of a processor of the system responsive to the at least one configuration message, wherein the at least one configuration message is a WBEM-compliant protocol message using a transmission control protocol (TCP) protocol.

5. The method of claim 3, further comprising provisioning at least a portion of an operating system (OS) from the resource manager to the system in the pre-boot environment.

6. The method of claim 5, further comprising provisioning a workload from the resource manager to the system in the pre-boot environment.

7. The method of claim 6, wherein the system is to execute the workload using the OS.

8. The method of claim 5, wherein the at least a portion of an OS comprises a first OS kernel comprising an Extensible Firmware Interface (EFI)-bootable kernel.

9. The method of claim 8, further comprising providing a second OS kernel to the system responsive to the configuration information provided to the resource manager.

10. The method of claim 9, wherein the system is to boot the second OS kernel responsive to a continue boot message from the resource manager, and execute a workload on the system using the second OS kernel, the workload provisioned by the resource manager.

11. An article comprising a non-transitory machine-accessible storage medium including instructions that when executed cause a system to:
   receive a request in a system including a service location protocol (SLP) directory agent from a client, wherein the client is in a pre-boot environment in which the client does not have a media access control (MAC) address associated therewith, but has an internet protocol (IP) address, and wherein a minimal OS kernel is executed in the pre-boot environment to initiate a common information model (CIM) broker and a service agent, and
   send an advertisement from the SLP directory agent over a transmission control protocol (TCP) protocol, and responsive to the advertisement to register a web-based enterprise management (WBEM) service for the client to the SLP directory agent.

12. The article of claim 11, further comprising instructions that when executed enable the system to transmit at least one configuration message from a resource manager of the system, and wherein the client is configured in the pre-boot environment responsive to the at least one configuration message.

13. The article of claim 11, wherein the client comprises a minimal OS kernel comprising an Extensible Firmware Interface (EFI)-bootable kernel.

14. The article of claim 13, further comprising instructions that when executed enable the system to transmit a second OS kernel from the resource manager to the client, wherein the client is to store the second OS kernel in a non-volatile storage, the second OS kernel provided responsive to information of the client provided to the resource manager.

15. A system comprising:
a processor coupled to a memory to execute instructions; and
a storage medium including the instructions that when executed by the processor enable the system to receive in a service location protocol (SLP) directory agent a multicast request from a client without predetermined configuration information and having a common information model (CIM) broker and a service agent, the client coupled to the SLP directory agent via the service agent, provide a unicast acknowledgement from the SLP directory agent to the client, receive a registration of a web-based enterprise management (WBEM) service in the SLP directory agent via the service agent, and send a message to a resource manager coupled to the SLP directory agent to indicate presence of the WBEM service.

16. The system of claim 15, wherein the resource manager is to transmit at least one configuration message to configure the system in a pre-boot environment responsive to the at least one configuration message.

17. The system of claim 16, wherein the configuration of the system includes updating at least one configuration register of a processor of the client responsive to the at least one configuration message corresponding to a WBEM message of a transmission control protocol (TCP) protocol.

18. The system of claim 17, wherein the instructions further enable the system to provision an operating system (OS) following the configuration of the system and to execute a workload on the system using the OS, the workload provisioned from the resource manager in the pre-boot environment.

\* \* \* \* \*